March 23, 1948.  H. MADISON  2,438,248

TIRE CHAIN LINKAGE

Filed Jan. 10, 1946

Inventor
HARRY MADISON.

By Arthur H. Sturges.
Attorney

Patented Mar. 23, 1948

2,438,248

UNITED STATES PATENT OFFICE 2,438,248

TIRE CHAIN LINKAGE

Harry Madison, Fullerton, Calif.

Application January 10, 1946, Serial No. 640,258

7 Claims. (Cl. 152—241)

The present invention relates to anti-skid chains, traction devices and the like, particularly useful in conjunction with wheeled vehicles, such as automobiles and trucks.

An object of the invention is to provide a device, the several parts of which are so constructed and cooperatively joined together that they may be readily taken apart by an unskilled person, and without the use of tools.

Another object of the invention is to provide a tire chain device for the above purpose which is so constructed that worn cross links thereof may be readily manually detached from the side chains employed and new cross chains substituted therefor, and without an employment of extraneous means.

Other and further objects and advantages of the invention will be understood from the following detailed description thereof.

As heretofore practiced in the art at times when a cross chain of an automobile traction device becomes unduly worn resultant from use, it has been necessary to place the ends of the cross chain in a vise and employ a chisel and hammer for detaching the cross chain from the side chains and similarly it has been necessary to pound the hooks at the ends of a cross chain into position for attaching said ends to the side chains and the present invention aims to obviate certain undesirable factors of the prior practice by providing a traction device which is so constructed that the cross chains thereof may be readily detached from the side chains thereof and without any employment of any media other than the fingers of an operator, said device to be of economical construction and readily manipulatable by an unskilled person.

It is a further object of the invention to provide a device for the above-stated purposes which is so constructed that new cross chains may be readily substituted for worn cross chains at times when the latter become broken and while the vehicle is remotely disposed with respect to garages, machine shops and the like, the services of which are usually required, as heretofore, during a repair of a traction device.

Figure 1:
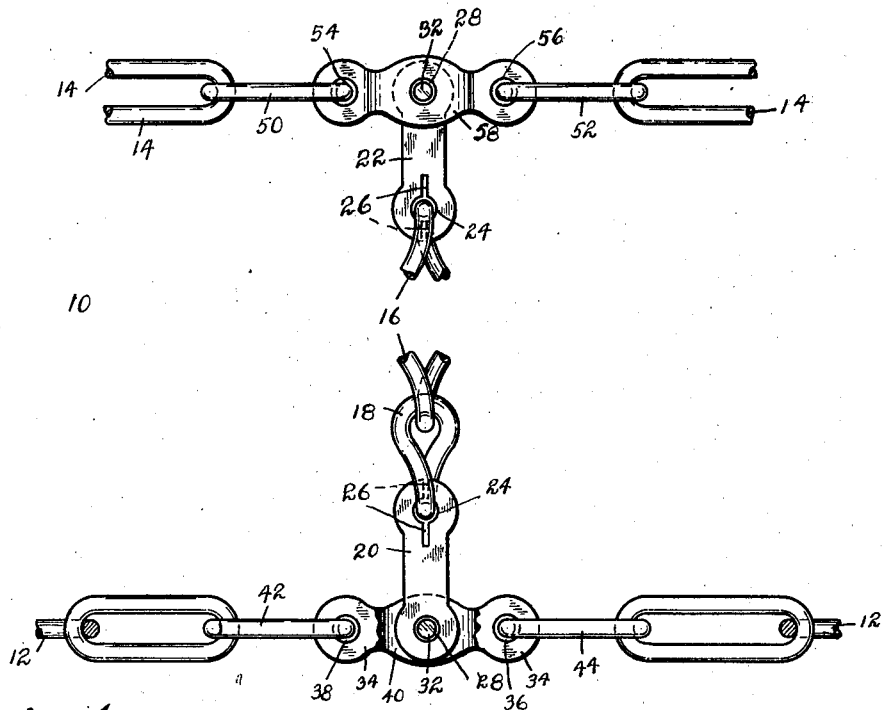
Figure 1 is a top plan view of a segment of a tire chain and depicting an embodiment of the present invention, certain portions thereof being broken away and others showing in section.

Referring now to the drawing for a more particular description, 10 indicates generally an automobile traction device having oppositely disposed chains 12 and 14. The ends of the chains 12 and 14 are adapted to be connected together by conventional clasps, not shown, for securing the chains adjacent the opposite sides of the wheel of a vehicle in a well known manner, said clasps being such as or similar to the clasp indicated at E in Figure 2 of Patent No. 1,135,856.

The new device includes a plurality of spaced-apart cross chains 16, and since each cross chain 16 is alike with respect to the other cross chains thereof, but one cross chain and its adjunct parts is minutely described herein.

The cross chain 16 includes a plurality of twisted links such as the link 18, said links being joined together, as best shown in Figure 1.

At each end of the cross chain 16, like tangs 20 and 22 are provided.

The inwardly disposed ends of said tangs are each provided with like apertures 24. The apertures are each in communication with a kerf 26 for facilitating an attachment of the end links of the cross chain 16 through the apertures 24, as shown in Figure 1.

The outwardly disposed ends of the tangs are each provided with like apertures 28 for receiving the shanks 30 of pins 32 therethrough.

Figure 2:
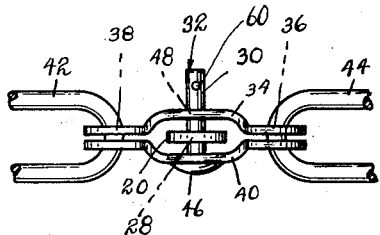
Figure 2 is a side view of a portion of said segment.

During use, the shanks 30 each also extend through oppositely disposed link portions of two-piece links, as shown in Figure 2. The link portion 34 is provided at each of its ends with oppositely disposed apertures 36 and 38 and the link portion 40 is similarly provided with like apertures. The link 42 of the side chain 12 is disposed through the aperture 38 and through the like aperture of the link portion 40 during use, as shown in Figure 1. Similarly, the link 44 of the side chain 12 is slidably disposed through the aperture 36 and through the like aperture of the link portion 40.

The head 46 of the pin 32 is welded or otherwise suitably secured to the main body portion of the link portion 40, the shank of said pin being disposed through the aperture 28 of the tang 20 and also through the aperture 48 provided through the main body portion of the link portion 34 for locking the tang 20 to the side chain 12 during use. The tangs are preferably employed and when not used the shank 30 of the pin is disposed through the eye of the end link of the chain 16.

The links 50 and 52 of the side chain 14 are similarly disposed through the apertures 54 and 56 of the link portion 58, said links 50 and 52 also extending through the oppositely disposed mate of the link portion 58. The pins 32 are similar in all respects and respectively extend through the tangs 22 and 20 of the cross chain 16 and through both portions of the two-piece links of the side chains.

Figure 3:
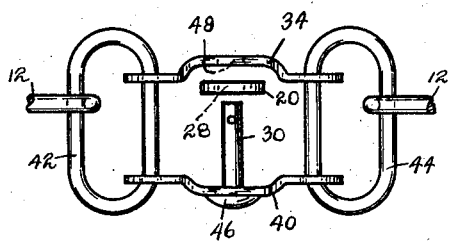
Figure 3 is a view similar to Figure 2 and showing the relative position of certain parts thereof during a removal of a cross chain therefrom.

It will be seen that during use an end of a cross chain 16 is operatively secured to the side chain 12, since the links 42 and 44 are each elongated and have arcuate end portions, best shown in Figure 3, for guiding and holding the link portions 34 and 40 together, with the tang 20 therebetween during use, since tension is applied longitudinally to the side chain 12 for causing the longitudinal length of the links 42 and 44 to align so that their arcuate ends crowd the members 34 and 40 toward each other and to the position shown in Figure 2, whereby said link portions are prevented from spreading apart unduly with respect to each other. At times when the side chain 12 is slack, during use, and the link portions 34 and 40 spread apart slightly with respect to each other, the tang 20 is maintained in an attached position, since the shank 30 of the pin 32 is long enough for the said purpose.

At times when it is desired to manually detach the tang 20 from the side chain 12, the links 42 and 44 of the latter are turned 90 degrees and from the normal position thereof as shown in Figure 2, to their respective positions, as shown in Figure 3, so that the link portion 34 may be moved away from the link portion 40 a distance greater than the length of the shank 30 of the pin 32, whereby the tang 20 may be readily removed from said shank.

Similarly, the tang 22 is readily removable with respect to the side chain 14 for detaching the other end of the cross chain 16 from the assembly and it will be seen that a new cross chain may be readily substituted for the cross chain 16 and without an employment of tools nor other means except the fingers of the operator.

Figure 4:
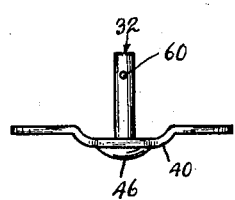
Figure 4 depicts a portion of a two-piece link employed.

It has been found in actual practice that the above described means is ample for securing the desired resultant. However, if desired, a hole 60 may be provided through the shank 30, as shown in Figure 4, for the reception of a cotter pin therethrough so that the pieces 34 and 40 of the two-piece link are prevented from spreading apart a distance which is greater than the distance between the head 46 of the pin 32 and the hole 60.

From the foregoing description, it is thought to be obvious that a tire chain linkage constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish it to be understood as limiting myself to the precise arrangement and formation of the several parts herein shown in carrying out my invention in practice, except as claimed.

I claim:

1. In a traction device for a wheel of a vehicle having side chains and cross chains, said side chains each having a plurality of elongated links, and means for attaching an end of a cross chain to and between two of said elongated links, said means comprising a tang secured to said end of said cross chain and having an aperture, a link of two-piece construction disposed between said two elongated links, one of said pieces being provided with a hole between its ends, the other piece being provided with a pin secured thereto between its ends, said pin being disposed through said aperture and said hole, said pieces being juxtaposed and said tang being disposed between them, said pieces each being provided with an aperture adjacent each of their ends, end portions of said elongated links being respectively normally disposed through the apertures at each end of said two-piece link, the length of the shank of said pin being greater than the distance between the longer sides of said elongated links and less than the length of said sides, whereby said elongated links may be manually turned with respect to said two-piece link for permitting said pieces to be spread apart a distance sufficient to permit said tang to be removed from said shank.

2. In a chain assembly, two elongated chain-links each having approximately semi-circular end portions, said assembly having a chain provided with an opening at its end, a pair of juxtaposed link members, each of said members having an aperture at each of their ends, said chain-links being respectively slidably disposed through two apertures at opposite ends of said pair, and a pin secured to one of said members, the other member being provided with a hole between its ends, the said end of said chain being disposed between said members, the shank of said pin being disposed through the opening of said end of said chain and through the hole of said other member, the length of said shank being greater than the distance between the sides of either of said chain-links and less than the length of either of said sides for permitting said end of said chain to be removed from said shank at times when said sides of the chain-links are disposed in approximate parallelism with said shank.

3. In a chain assembly, two elongated chain-links each having end portions of approximately semi-circular contour in plan and approximately parallel side portions, and a pair of juxtaposed link members each having an aperture at each end thereof, said chain-links being respectively slidably disposed through end apertures of said pair, the construction being such that at times when the chain-links are aligned and tension applied thereto, said end portions of said chain-links urge said link members toward each other.

4. In a chain assembly, two elongated chain-links each having end portions of approximately semi-circular contour in plan and approximately parallel side portions, a pair of juxtaposed link members each having an aperture at each end thereof, said chain-links being respectively slidably disposed through end apertures of said pair so that at times when the chain-links are aligned and tension applied thereto, said end portions of said chain-links urge said link members toward each other, and a tang attached to said link members.

5. In a chain assembly, two elongated chain-links each having end portions of approximately semi-circular contour in plan and approximately parallel side portions, a pair of juxtaposed link members each having an aperture at each end thereof, said chain-links being respectively slidably disposed through end apertures of said pair so that at times when the chain-links are aligned and tension applied thereto, said end portions of said chain-links urge said link members toward each other; and a tang removably attached to said link members.

6. In a chain assembly, two elongated chain-links each having approximately semi-circular end portions, said assembly having a chain provided with an opening at its end, a pair of juxtaposed link members, each of said members having an aperture at each of their ends, said chain-links being respectively slidably disposed through two apertures at opposite ends of said pair, a pin carried by one of said members, the other member being provided with a hole between its ends, the said end of said chain being disposed between said members, the shank of said pin being disposed through the opening of said end of said chain and through the hole of said other member, and means for maintaining said pin disposed through said aperture and said hole during operation.

7. In a traction device for a wheel of a vehicle having side chains and cross chains, said side chains each having a plurality of elongated links, and means for attaching an end of a cross chain to and between two of said elongated links, said means comprising a tang secured to said end of said cross chain and having an aperture in one end thereof, the other end of said tang being bifurcated, the walls of said bifurcation being recessed for the reception of said one end of said cross chain, a link of two-piece construction disposed between said two elongated links, one of said pieces being provided with a hole between its ends, a pin carried by said other piece between its ends, said pin being disposed through said aperture and said hole, said pieces being juxtaposed and said tang being disposed between them, said pieces each being provided with an aperture adjacent each of their ends, end portions of said elongated links being respectively normally disposed through the apertures at each end of said two-piece link, and means for maintaining said pin disposed through said aperture and said hole during operation.

HARRY MADISON.

REFERENCES CITED

The following references are of record in the file of this patent:

UNITED STATES PATENTS

| Number | Name | Date |
|---|---|---|
| 598,014 | Schry | Jan. 25, 1898 |
| 1,942,338 | Kennedy | Jan. 2, 1934 |